Nov. 20, 1951    C. A. WASHBURN    2,576,057
PLAN POSITION INDICATOR CIRCUIT
Filed Sept. 27, 1945
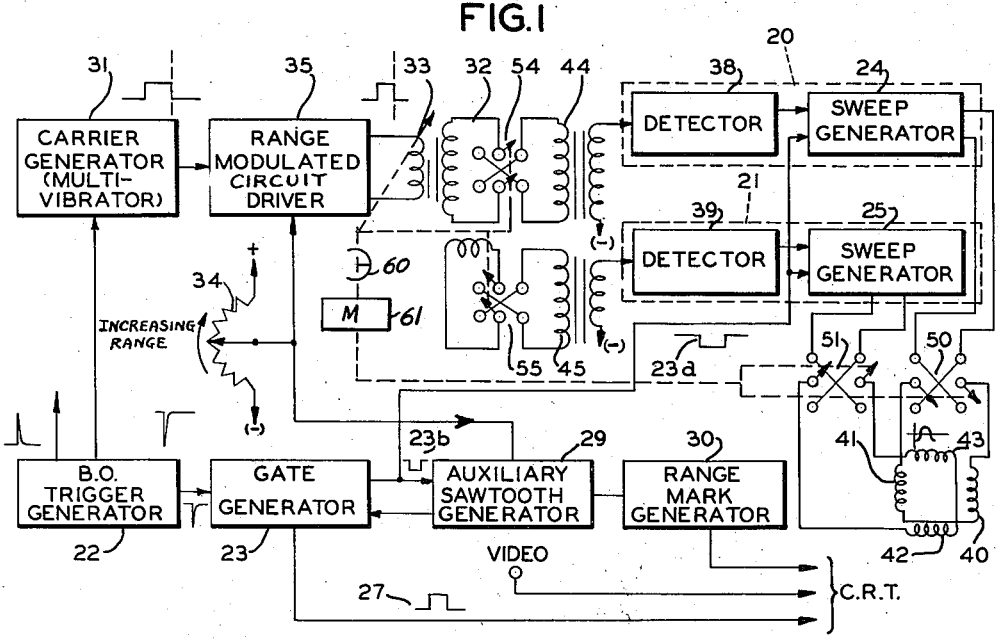
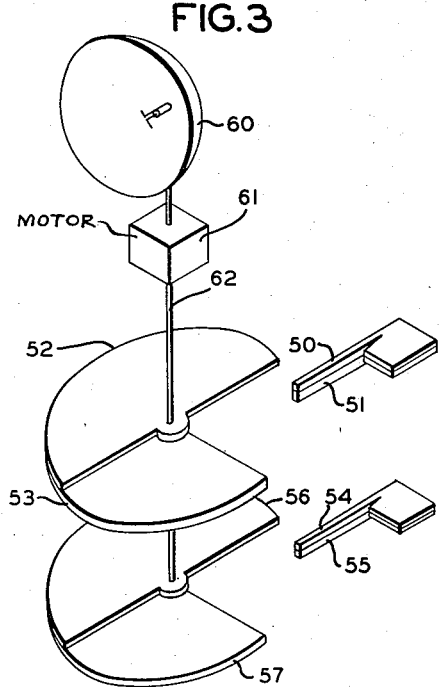
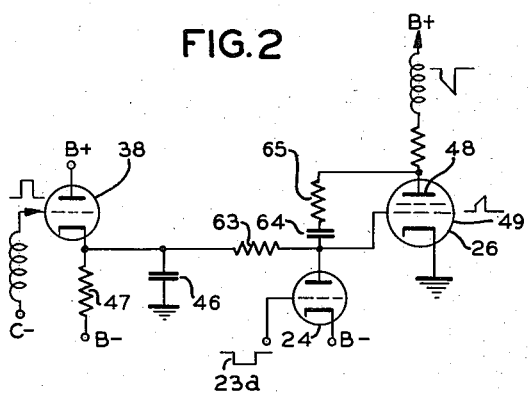
INVENTOR
CLAYTON A. WASHBURN
BY
ATTORNEY Patented Nov. 20, 1951

2,576,057

UNITED STATES PATENT OFFICE 2,576,057

PLAN POSITION INDICATOR CIRCUIT

Clayton A. Washburn, Westwood, Mass., assignor, by mesne assignments, to the United States of America as represented by the Secretary of the Navy Application September 27, 1945, Serial No. 618,976

11 Claims. (Cl. 343—11)

This invention relates to plan position indicator circuits for use in connection with radio echo detection apparatus, and more particularly to such a circuit including novel means for obtaining the D.-C. sine and cosine voltage components necessary for modulation of the sweep driver circuits.

In the construction of plan position indicator circuits of the electronic rotating variety, present practice is to divide the screen of the cathode ray tube into four quadrants. A driver stage modulating voltage is supplied for each quadrature voltage, the voltages being 90° out of phase, thus providing a voltage sweep. Except in the case of the push-pull drives where voltages are 180° out of phase, the voltage components are independent of each other with the result that such circuits are not sufficiently accurate in angular and range position for use in applications requiring precise indication. Such inaccuracy arises primarily from the difficulty of matching the voltage components. This invention provides a plan position indicator system in which the necessity of balancing opposite driver tubes is eliminated, thereby furnishing a more accurate circuit than that commonly in use.

An object of this invention is to provide a novel circuit for obtaining plan position indication by use of synchronized detector circuits for obtaining D.-C. sine and cosine voltage components necessary for modulation of sweep driver circuits.

Another object of this invention is to provide a plan position indicator circuit having single-ended sweep drivers rather than double-ended sweep drivers commonly used in connection with such circuits.

A further object of this invention is to provide a plan position indicator circuit in which the phase shift and ripple associated with conventional unsynchronized carrier-detector-filter arrangements are eliminated.

A still further object of this invention is to provide a plan position indicator circuit requiring a smaller number of sweep driver tubes and associated circuits than are normally required in such a circuit.

A particular object of this invention is to provide a plan position indicator circuit having means for changing the polarity of the deflection yokes in response to a predetermined amount of antenna rotation.

Further objects and advantages of this invention, as well as its construction, arrangement, and operation, will be apparent from the following description and claims in connection with the accompanying drawings in which:

Fig. 1 is a block diagram of a plan position indicator circuit as contemplated by this invention;

Fig. 2 is a schematic diagram of one of two identical synchronized detector circuits for obtaining D.-C. sine and cosine voltage components necessary for modulation of sweep driver circuits together with switching means for reversing the polarity of the deflection yokes of a plan position indicator in response to a predetermined amount of rotation of the antenna spinner;

Fig. 3 is a schematic diagram of cams and microswitches for changing the polarity of the deflection yokes of the plan position indicator and for reversing the synchro transformer in response to rotation of the antenna spinner.

As shown in Fig. 1, there is provided a novel circuit for obtaining plan position indication embodying a pair of synchronized detector-sweep generators 20 and 21 for obtaining D.-C. sine and cosine voltage components necessary for modulation of the sweep driver circuits. A blocking oscillator 22 is provided to furnish a positive trigger for the transmitter pulse (transmitter not shown), and a negative trigger for starting a negative gate generator 23, the negative voltage gate 23a therefrom being fed to the control grids of sweep generators 24 and 25, thereby controlling the time duration of the output of the similar horizontal and elevation deflection yoke sweep drivers, one of which is shown at 26 of Fig. 2. Gate generator 23, upon being triggered by trigger generator 22, also develops a positive gate 27 for unblanking the cathode ray tube (not shown) and at the same time feeds a negative gate 23b to an auxiliary saw-tooth generator 29, gate 23b being fed to generator 29 at the same instant gate 23a is fed to sweep generators 24 and 25. Auxiliary saw-tooth generator 29 is designed to cutoff at fixed amplitude of the saw-tooth wave generated thereby, and operates to cut off gate generator 23 whenever the saw-tooth wave developed in generator 29 reaches a predetermined amplitude. Auxiliary saw-tooth generator 29 may be connected to a range mark generator 30 in order to trip a coincidence circuit comprising a part of the range mark generator.

Trigger generator 22, in addition to producing a negative trigger for gate generator 23, simultaneously generates a negative trigger which is fed to a carrier wave generator 31 which may be a sine wave or pulse generator or a generator of any other wave form capable of passage through a transformer. Carrier wave generator 31 in this instance is indicated as being a triggered multivibrator but the operation is substantially identical with any of the previously mentioned signal generators. Upon receipt of the negative trigger from trigger generator 22, carrier generator 31 is cut off, thereby establishing coincidence between the trailing edge of the square wave carrier voltage developed by generator 31 and the transmitter pulse. The carrier wave is fed to driver circuit 35 where its amplitude is modulated proportional to a D.-C. voltage from range potentiometer 34. Driver circuit 35 applies the range modulated carrier waveform to rotary transformer 32, the rotor 33 of which is rotated in synchronism with the antenna spinner as indicated by the dotted line mechanical connections in Fig. 1. The D.-C. range voltage from potentiometer 34 also supplies the input to auxiliary saw-tooth generator 29, the time rate (slope) of generator 29 being proportional to, and determined by, the voltage from range potentiometer 34. Since cutoff of auxiliary generator 29 occurs at constant amplitude, potentiometer 34 constitutes a control for varying the duration (range) of gate generator 23, the relation being such that time (range) is inversely proportional to the output voltage of potentiometer 34. Since the carrier wave is fed through rotary transformer 32 to sweep generators 24 and 25, the slope of the sweep generators is proportional to the amplitude of the carrier wave and hence also proportional to range potentiometer 34 voltage. The square carrier wave is fed to rotor 33 of two-phase rotary transformer 32 which is rotated by the antenna so that the detected amplitude from transformer 32 is a function of the antenna position. That is, since the stators of rotary transformer 32 are 90 degrees out of phase with each other, one voltage is proportional to the sine of the antenna angle and the other is proportional to the cosine of that angle. The two phase rotary transformer output is fed to detectors 38 and 39 and used to modulate horizontal and vertical sweep generators 24 and 25 which are single-ended voltage feedback circuits operating from cutoff. As heretofore explained, the slope of the saw-tooth wave developed by generator 29 is determined by the setting of range potentiometer 34, so that the duration of all sweeps is determined by the potentiometer setting. The interaction of the circuit is such that the range voltage determines the slope of the saw-tooth wave developed by generator 29, which cuts off at constant amplitude, and which in so doing, terminates all gates developed by gate generator 23. That is to say, the voltage components which position the sweep on the screen of the scope in coincidence with the antenna position, and whose amplitudes depend upon the range potentiometer setting, are available at the input of the sweep generator at the instant the transmitter pulse occurs, starting the range sweep and unclamping the sweep generator. The range potentiometer may be calibrated to read range directly.

Fig. 2 is a schematic diagram of one of the two identical synchronized detector and sweep generator circuits 20 and 21 shown in Fig. 1 for obtaining a saw-tooth current to provide linear deflection in the deflection coils. As shown, a positive carrier wave is fed to the grid of a triode tube 38, causing the tube to become conductive, thereby positively charging a capacitor 46. Discharge of capacitor 46 is through a resistor 47 connected to the cathode of tube 38 and through a sweep generator input resistance 63. The R.-C. time constant is made sufficiently large to cause the rate of discharge of capacitor 46 to be only slightly greater than the maximum rate of amplitude modulation of the carrier wave in rotary transformer secondaries (44 or 45 of Fig. 1) due to the antenna rotation. In this manner the sweep generator input voltage on the cathode of tube 38 follows the antenna rotation without introducing any phase shift. This is particularly important where the antenna rotation may be somewhat variable, thus introducing variable phase shift in the plan position indicator pattern. On the other hand, since the carrier wave is synchronized to the sweep generator circuit, there is no ripple apparent upon the plan position indicator pattern due to any ripple which may occur on the detector (tube 38) output. The output of detector tube 38 therefore consists essentially of slowly varying sine and cosine waves having a frequency proportional to the antenna rotation and in which the negative half cycle is inverted.

A linear sweep generator of the voltage feedback type is provided, the sweep generator comprising a tetrode tube 49 and a feedback network including a condenser 64 and a resistor 65 for generating the required voltage wave form which results in a linear deflection current through deflection yoke 42—43 or 40—41. Tube 49 is operated below cutoff prior to start of the sweep in order to assure that no current will flow prior to the sweep. When the negative trigger from trigger generator 22 cuts off the carrier wave it also initiates the start of negative gate 23a, which is impressed upon the grid of tube 24 cutting it off. Current flowing from detector tube 38 through resistor 63 and tube 24 is thereby caused to flow into capacitor 64 and resistor 65 resulting in a step voltage and linear saw-tooth being generated at the plate 48 of tube 49. This voltage will be the voltage required to give a linear deflection current if the R.-C. product of capacitor 64 and resistance 65 equals or very nearly equals the inductance of the deflection yoke divided by the resistance of that yoke.

Due to the use of single ended voltage feedback circuits, current will pass through the deflection yokes in only one direction. It will therefore be necessary that polarity of the deflection yokes be reversed periodically. Means for accomplishing this result are shown in Fig. 3.

In order to obtain a reversal of the direction of the plan position indicator pattern, the polarity of the deflection yokes, and for a pulsed carrier generator, the synchro transformer secondaries 44 and 45 of Fig. 1 must be reversed at each 180 degrees of antenna spinner rotation, but it will readily be understood that the horizontal deflection coil polarity will be reversed 90 degrees out of phase from the reversal of the vertical deflection coil. Fig. 3 is a schematic diagram of means for accomplishing this result. Referring to the figure, there is shown an antenna 60 which is caused to rotate by a suitable motor 61. A shaft 62 which rotates in coincidence with antenna 60, is provided with a pair of cams 52 and 53 for actuating double pole double throw microswitches 50 and 51 respectively, thereby switching the polarity of horizontal and vertical deflection yokes 40, 41, and 42, 43 in response to rotation of antenna 60. It will readily be understood that cams 52 and 53 are so oriented with respect to each other as to cause reversal of the horizontal deflection coil 90 degrees out of phase from the reversal of the vertical deflection coil. If a pulse generator is used to generate the carrier wave, the secondaries of the rotary transformer must also be reversed at the same time. Similar microswitches 54 and 55 may be actuated by cams 56 and 57 attached to shaft 62 for accomplishing this purpose, the electrical connections of these switches being shown in Fig. 1. If a sine wave carrier generator is used in place of a pulse generator it will be apparent that the secondaries of the rotary transformer need not be reversed. It will readily be understood that when the antenna is rotated in a counterclockwise direction, both the sine and the cosine deflection coils are positive in the first quadrant, the cosine coil is reversed as they pass into the second quadrant, the sine coil is reversed on reaching the third quadrant, and the cosine reversed on coming into the fourth quadrant. As heretofore stated, the rotary transformer secondaries must be reversed at the same time although this is unnecessary if a sine wave carrier generator is used rather than the square wave carrier generator.

While a particular arrangement of structure has been disclosed and described, it is to be understood that various changes may be made in this invention without departing from the spirit and scope thereof as set forth in the appended claims.

What is claimed is:

1. In a circuit for obtaining plan position indication, an antenna, a two-phase rotary transformer having the rotor thereof operatively coupled to said antenna, a carrier wave generator connected to said rotor, a pair of synchronized detector circuits connected to the secondaries of said transformer for obtaining varying direct current voltages proportional to the sine and cosine of the antenna angle, single ended sweep varying circuits coupled to said detectors for energizing horizontal and vertical deflection coils, and means for reversing the polarity of said deflection coils in response to a predetermined amount of antenna rotation.

2. In a circuit for obtaining plan position indication, an antenna, a two-phase rotary transformer having the rotor thereof mechanically coupled to said antenna, a square wave generator connected to said rotor, a pair of synchronized detector circuits connected to the secondaries of said transformer for obtaining varying direct current voltages proportional to the sine and cosine of the antenna angle, single ended sweep generating circuits coupled to said detector circuits for energizing the horizontal and vertical deflection coils of a cathode ray tube, means for reversing the polarity of said deflection coils in response to a predetermined amount of antenna rotation, and means for simultaneously reversing the secondaries of said rotary transformer.

3. In a circuit for obtaining plan position indication, an antenna, a two-phase rotary transformer having the rotor thereof mechanically connected to said antenna, a carrier wave generator for passing a carrier wave which is synchronized with a transmitter pulse through said rotor, a pair of synchronized detector circuits connected to the secondaries of said transformer for obtaining varying sine and cosine voltages for modulating sweep generating circuits, single ended sweep generating circuits for energizing horizontal and vertical deflection coils, and means for reversing the polarity of said deflection coils in response to a predetermined amount of antenna rotation.

4. In a circuit for obtaining plan position indication, an antenna, a two-phase rotary transformer having the rotor thereof connected to said antenna, a square wave generator for passing a square carrier wave which is synchronized with the transmitter pulse through said rotor, a pair of synchronized detector circuits connected to the secondaries of said transformer for obtaining sine and cosine voltages for modulating sweep generating circuits, single ended sweep generating circuits for energizing horizontal and vertical deflection coils, means for reversing the polarity of said deflection coils in response to a predetermined amount of rotation of said antenna, and means for simultaneously reversing the secondaries of said rotary transformer.

5. In a system for producing a plan position indication on a cathode ray tube of the type having horizontal and vertical deflection coils, an antenna, a two-phase rotary transformer having a rotor rotatable in synchronism with said antenna and a pair of secondary windings, signal generating means coupled to said rotor for inducing signals in said secondary windings, a pair of detectors coupled to said secondary windings for obtaining a pair of voltages proportional to the sine and cosine of the angle of the antenna from a predetermined position, pair of sweep generators coupled to said detectors for generating a pair of sawtooth voltage signals proportional in amplitude to the magnitude of the aforesaid voltages, means coupling said sweep generators respectively to said horizontal and vertical deflection coils and including switching means for reversing the polarity of said deflection coils in response to a predetermined amount of antenna rotation.

6. Apparatus for producing polar scanning of a cathode ray tube having magnetic deflection coils, said apparatus comprising, a rotatable antenna, a two-phase rotary transformer having a movable coil rotatable in synchronism with said antenna and a pair of secondary coils in spaced quadrature, a generator connected to said movable coil for inducing energy in quadrature phase in said secondary coils, a pair of detector circuits coupled to said secondaries for obtaining a pair of voltages proportional to the position of said antenna, means coupled to said detectors for generating sawtooth voltage signals, and means coupling said last-mentioned means to the deflection coils of said cathode ray tube and including switching means for periodically reversing the polarity of said deflection coils.

7. Apparatus for producing polar scanning of a cathode ray tube having magnetic deflection coils, said apparatus comprising, a two-phase rotary transformer having a rotatable coil and a pair of secondary coils in spaced quadrature, a generator connected to said rotatable coil for inducing energy in quadrature phase in said secondary coils, a pair of detector circuits coupled to said secondary coils for obtaining a pair of varying direct current voltages proportional in amplitude to the position of said rotatable coil, means coupled to said detectors for producing a pair of sawtooth voltages proportional in amplitude to said varying direct current voltages, and means coupling said last-mentioned means to said deflection coils of said cathode ray tube including switching means for periodically reversing the polarity of said deflection coils.

8. Apparatus for producing polar scanning of a cathode ray tube having magnetic deflection coils, said apparatus comprising, a two-phase rotary transformer having a rotatable coil and a pair of secondary coils in spaced quadrature, a generator connected to said rotatable coil for inducing energy in quadrature phase in said secondary coils, means coupled to said generator for amplitude modulating said energy in accordance with the desired range of the polar scanning, a pair of detector circuits coupled to said secondary coils for obtaining a pair of varying direct current voltages proportional in amplitude and phase to the position of said rotatable coil, a pair of sawtooth generators coupled to said detectors for producing a pair of sawtooth voltages proportional in amplitude to said varying direct current voltage, and means coupling said sawtooth generators to said deflection coils including switching means for periodically reversing the polarity of said deflection coils in accordance with the position of said rotatable coil.

9. Apparatus for producing polar scanning of a cathode ray tube having magnetic deflection coils in spaced quadrature, said apparatus comprising, a two-phase rotary transformer having a rotatable coil and a pair of secondary coils in spaced quadrature, a pulse generator connected to said rotatable coil for inducing pulses in quadrature phase in said secondary coils, a pair of detector circuits coupled to said secondaries for obtaining a pair of varying direct current voltages proportional to the position of said rotatable coil, a pair of sawtooth generators coupled to said detectors for producing a pair of sawtooth voltages varying in amplitude with said varying direct current voltages for energizing said magnetic deflection coils, means for reversing the polarity of said deflection coils in accordance with the position of said rotatable coil, and switching means for simultaneously reversing the polarity of the secondaries of said rotary transformer.

10. Apparatus for producing polar scanning of a cathode ray tube having magnetic deflection coils in spaced quadrature, said apparatus comprising, a two-phase rotary transformer having a rotatable coil and a pair of secondary coils in spaced quadrature, a generator connected to said rotatable coil for inducing an alternating voltage signal in quadrature phase in said secondary coils, a pair of detector circuits coupled to said secondary coils for obtaining a pair of varying direct current voltages proportional to the position of said rotatable coil, a pair of sawtooth generators coupled to said detectors for producing a pair of sawtooth voltages varying in amplitude with said varying direct current voltages for energizing said magnetic deflection coils, and switching means for reversing the polarity of said deflection coils in response to the position of said rotatable coil.

11. In a pulse echo detection system having a rotatable antenna, apparatus for producing polar scanning of a cathode ray tube having horizontal and vertical deflection coils, said apparatus comprising a two-phase rotary transformer having a movable coil rotatable in synchronism with said antenna and a pair of secondary coils in spaced quadrature, signal generating means coupled to said movable coil for inducing signals in said secondary coils in phase quadrature, a pair of detectors coupled to said secondary coils for obtaining a pair of voltages which vary sinusoidally and cosinusoidally with the rotation of said antenna, a pair of sweep generators coupled to said detectors for generating a succession of sweep voltages for energizing said deflection coils, the amplitude of said sweep voltage being proportional to said voltages from said detectors, means coupled to said sweep generators for limiting the duration of said sweeps to a predetermined time, and switching means mechanically operated by the rotation of said antenna for reversing the polarity of said deflection coils each 180 degrees of rotation of said antenna.

CLAYTON A. WASHBURN.

REFERENCES CITED

The following references are of record in the file of this patent:

UNITED STATES PATENTS

| Number | Name | Date |
| --- | --- | --- |
| 2,403,967 | Busignies | July 16, 1946 |
| 2,408,041 | Busignies | Sept. 24, 1946 |
| 2,409,456 | Tolson et al. | Oct. 15, 1946 |
| 2,471,516 | Bryant | May 31, 1949 |